(12) United States Patent
Burns, Jr.

(10) Patent No.: US 6,874,229 B2
(45) Date of Patent: Apr. 5, 2005

(54) CONNECTING ROD WITH ELLIPITICAL OPENING AND METHOD FOR PRODUCTION

(76) Inventor: Andrew S. Burns, Jr., 1971 Deer Trail, Floresville, TX (US) 78114

( * ) Notice: Subject to any disclaimer, the term of this patent is extended or adjusted under 35 U.S.C. 154(b) by 158 days.

(21) Appl. No.: 10/217,020

(22) Filed: Aug. 12, 2002

(65) Prior Publication Data

US 2004/0025626 A1 Feb. 12, 2004

(51) Int. Cl.[7] .............................................. B21D 53/84
(52) U.S. Cl. .............................. 29/888.09; 29/888.092; 74/579 R; 74/579 E
(58) Field of Search ...................... 29/888.09, 888.092; 74/579 R, 579 E

(56) References Cited

U.S. PATENT DOCUMENTS

| | | | |
|---|---|---|---|
| 3,768,344 A | * | 10/1973 | Feldcamp .................. 76/107.1 |
| 5,135,209 A | * | 8/1992 | Penny .......................... 269/249 |
| 6,282,784 B1 | * | 9/2001 | Genouille ................. 29/888.09 |
| 6,502,480 B1 | * | 1/2003 | Walker et al. ............ 74/579 E |
| 6,560,869 B1 | * | 5/2003 | Schlegel et al. ......... 29/888.09 |

FOREIGN PATENT DOCUMENTS

JP          03125012 A   *   5/1991   ............. F16C/9/04

\* cited by examiner

*Primary Examiner*—David A. Bucci
*Assistant Examiner*—Bradley J. Van Pelt
(74) *Attorney, Agent, or Firm*—Gunn & Lee, PC

(57) ABSTRACT

A connecting rod with an elliptical opening couples with a crankshaft without the use of a separate bearing element. The elliptical opening deforms under axial tension during operation to provide proper clearance between an inner surface of the opening and an outer surface of the crankshaft. A method for producing a connecting rod with an elliptical opening includes creating an initial form, compressing the crankshaft end of the form with a clamping means, honing a circular opening, releasing the clamping means, and forming radii at each edge of the resulting opening.

9 Claims, 5 Drawing Sheets

CONNECTING ROD WITH ELLIPITICAL OPENING AND METHOD FOR PRODUCTION

BACKGROUND OF THE INVENTION

1. Field of the Invention

The present invention relates to a connecting rod and to a method of producing a connecting rod and, more particularly, to a connecting rod with an elliptical opening that eliminates the need for bearings.

2. Background Information

Typically, internal combustion engines include a connecting rod for connecting pistons to a crankshaft. The function of the connecting rod is to transfer power from the pistons to the crankshaft. The connecting rod must act as a unitary piece to transfer dynamic forces with better life. Connecting rods for coupling pistons and crankshafts are designed with a small ring-shaped end and a large ring-shaped end joined together by a rigid member that is connected to the outer periphery of each ring portion. The small ring-shaped end is designed as a bushing or as a press-fit connection for receiving a bearing for rotationally receiving a piston pin, and the large end is designed for rotationally receiving the crankshaft.

Most connecting rods may be broadly categorized in two types. The first more complex type is a split ring connecting rod, or so-called "cut" or "cracked" connecting rod in which the large connecting rod opening that surrounds the crankshaft is cut or cracked to open it. As a rule, the small connecting rod opening does not need to be opened since it is connected to the piston by a straight bolt. In such connecting rods, the large end surrounding the crankshaft is formed as two C-shaped halves, each containing an inner bearing surface and either bolted together across the joint, or split, formed by the ends of the C-shaped section in position about the crankshaft. The second type is a one-piece connecting rod in which the ring section forming a bearing around the crankpin is continuous, without bolted joints. The simplicity of the one-piece connecting rod is offset by more demanding considerations in crankshaft design. One piece connecting rods require the crankshaft to be either assembled around the connecting rods or to be designed in such a way as to allow the engine to be assembled by passing the large circular shaped end of the connecting rods over an end of the crankshaft and along the crankshaft onto the crankpin.

To allow the crankshaft to rotate properly within the larger opening of the connecting rod, bearings are inserted. Depending upon the load applied to the bearing, connecting rod openings are made with a variety of bearing shells providing a friction surface. In particular, supporting shell materials used in bearing shells are as a rule made of C 10 steel according to DIN 17210 or SAE 1010. Depending upon the particular design and application, the bearing shells may be cold hardened. The actual bearing surface layer, which may, for example, be white metal, leaded bronze, light metal, spatter coatings or the like depending upon the expected bearing load, may be applied to the supporting shell material. The bearing shells may be three-component, two-component or solid single component bearing shells. The shells are assembled to the connecting rod opening with an initial stress so that the bearing shells have a satisfactory firm seat upon assembly.

Operationally reliable connecting rods require a wear-resistant design and construction in order to transmit the bearing forces reliably and at permissible operating temperatures. Wear resistance is always provided when the sliding surfaces are separated from each other by a lubricating film such as an oil film that is capable of bearing a load. As a result, the bearings are designed to provide just enough clearance between the inner surface of the bearings and the outer surface of the crankshaft to allow for a hydrodynamic oil film. Thus, friction is minimized resulting in relatively low heat generation. However, when running in a failure mode, for example when an engine runs out of oil, there is a loss of lubrication between the bearing and the crankshaft, and heat rapidly builds up in the bearing. The loss of oil film also results in increased friction between the rotating surfaces of the crankshaft and bearing which in turn increases the load on the engine. This increased load also further increases friction. As a result there is an exponential increase in the amount of heat generated between these two rotating surfaces which occurs in a very short period of time. The temperature of the bearing thus increases at an extremely rapid rate, and, if the engine is not stopped, will reach the yield temperature of the components resulting in self-destruction of the bearing and massive damage to the interior of the engine.

While the engine is running, a tremendous amount of axial tension is placed on the connecting rod. If a bearing is designed with inadequate clearance, the axial tension deforms the bearing during operation squeezing out the oil film and constricting the bearing around the crankshaft. As described above, friction and heat generation increase, as well as the risk of premature wear and mechanical failure. To prevent this, the inner surfaces of bearings are designed to be elliptical in cross section, rather than circular. This allows the bearings to flex under the axial tension to become circular during operation, allowing the proper clearance for a hydrodynamic oil film. In conventional connecting rods, it is the inner surface of the bearings that are machined with this elliptical surface. To facilitate easy assembly, the connecting rod opening and the outside surface of the bearing are machined to be circular.

Conventional connecting rods are usually manufactured in a two-step process; the caps are sawed from the rod and the caps and rod ends are machined, and then fastened together and the bearing hole bored and honed. The fasteners are removed and the bearing shells are inserted and the rod assembly is fastened to the crankshaft. If the fastening is not adequate at either of these stations the chances for a non-uniform oil thickness or the chances of an improperly shaped hole is highly probable. These conditions alone can lead to a scored crank, spun bearing or even worse—a blown engine. Internal engine repairs and replacements are very expensive, both in monetary value and in customer satisfaction value.

While the function that bearings provide is highly desirable, adding bearings to each connecting rod adds extra weight and cost to the overall engine. Carmakers are increasingly looking to increase the efficiency of vehicles by reducing the overall weight. This is especially true within racing circuits, such as NASCAR, where small advantages in efficiency can make the difference between winning and losing a race. As a result, the additional weight added by connecting rod bearings is undesirable.

In the past, various types of connecting rods have been used without bearings. An example of a connecting rod without bearings is shown in U.S. Pat. No. 6,329,022 B1. This patent discloses a method for plasma-coating the surface of the larger connecting rod opening with a bearing material. This provides a high strength-bearing layer directly to the opening surface that is resistant to both wear and high temperatures. In addition, it asserts that with this strength-bearing layer, bearings are no longer needed allowing for a thicker and stronger connecting rod which can withstand higher loads. While the '022 patent provides a surface that is resistant to the wear and high temperatures caused by higher loads, by building up the connecting rod to help it withstand the higher loads. Essentially, additional material and weight is added onto the connecting rod to make up for the eliminated bearings. As a result, there is no reduction in weight and, therefore, no gain in overall efficiency. In addition, the connecting rod in the '022 patent is still susceptible to increased axial tension deforming the connecting rod opening resulting in non-uniform clearance between the crankshaft and the opening surface. For the reasons described above, this destroys the hydrodynamic oil film increasing the risk of premature wear and mechanical failure. Therefore, there is a long felt need for a connecting rod that can effectively connect to a crankshaft without bearings.

SUMMARY OF THE INVENTION

The present invention includes a connecting rod with an elliptical opening that operates without the aid of a separate bearing. It is desirable to have a connecting rod without a bearing for a number of reasons. Without the need for a bearing, the connecting rod contains less parts making it easier to assemble and reducing the cost of parts and assembly. In addition, the elimination of the bearing means less weight in a fully assembled internal combustion engine making the overall engine lighter and more efficient. The connecting rod includes a main shank with a piston end for coupling with a piston and a crankshaft end defining an elliptical opening. Each edge of the elliptical opening terminates in radii. The elliptical opening rotationally attaches to a crankshaft. The radii allow the connecting rod to tilt slightly from side to side without damaging the crankshaft. In addition, the radii reduce the contact area between the inner surface of the elliptical opening and the crankshaft resulting in less friction. During operation, the elliptical opening deforms to a circular opening to provide a uniform clearance sufficient for maintaining a uniform oil film between the elliptical opening of the crankshaft end and the crankshaft. The oil film provides lubrication decreasing the risk of premature wear and mechanical failure.

The present invention also includes a method for producing a connecting rod with an elliptical opening. The method includes creating an initial form with a main shank, a piston end, and a crankshaft end. Next, a small opening is formed in the piston end perpendicular to the longitudinal axis of the form. Then, through holes are formed in the crankshaft end and countersinks are formed in the crankshaft end parallel to the longitudinal axis of the initial form. After that, the crankshaft end is cut along a center axis to form a cap. The cap is fastened to the crankshaft end by inserting nuts and bolts through the through holes and countersinks. Afterward, the crankshaft end is compressed with a force sufficient to deform the crankshaft end. Next, a circular opening is honed in the compresses crankshaft end. Then, the crankshaft end is released from compression, allowing it to return to its original shape. As a result, the honed circular opening forms an elliptical opening. Finally, each edge of the elliptical opening is formed into radii.

Still other objects, features, and advantages of the present invention will become evident to those of ordinary skill in the art in light of the following.

DETAILED DESCRIPTION OF THE PREFERRED EMBODIMENT

Figure 1:
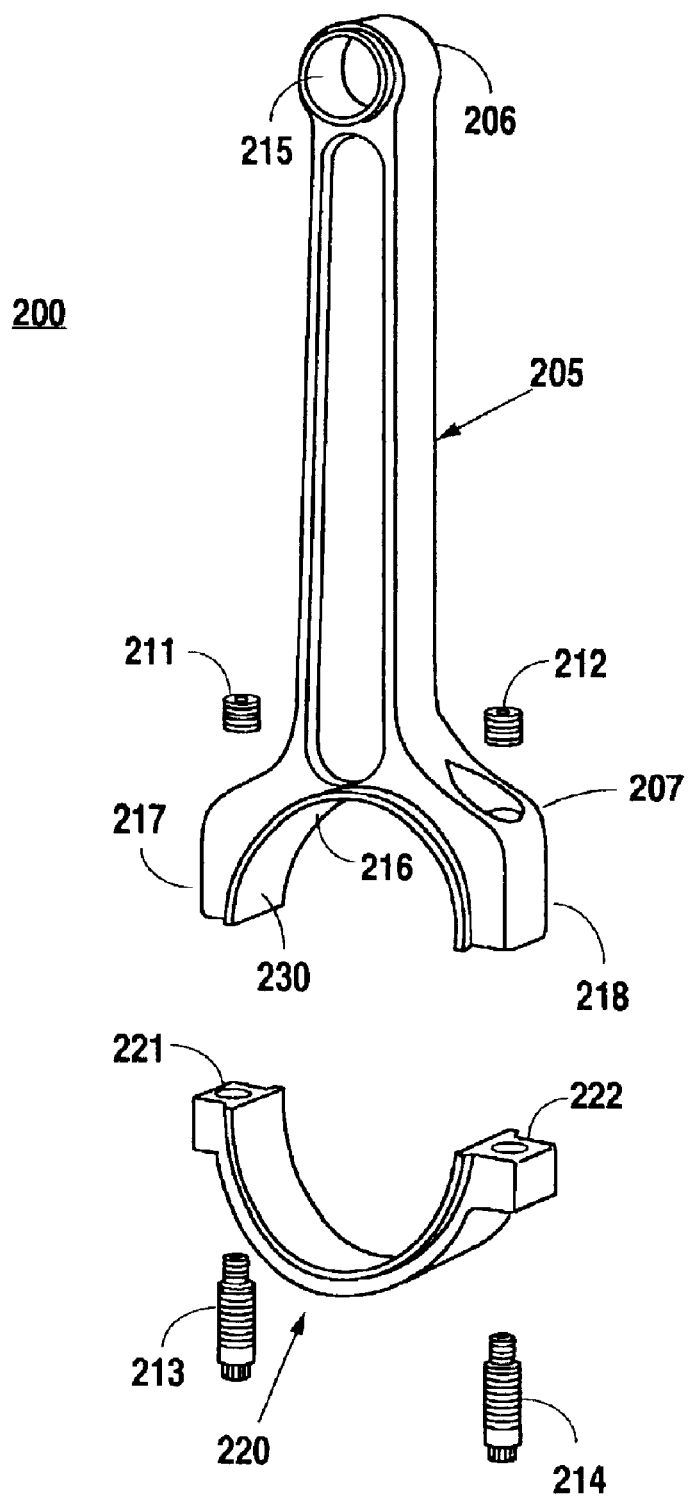
FIG. 1 an exploded view of a preferred embodiment of a connecting rod with an elliptical opening.

In a preferred embodiment of the present invention, illustrated in FIG. 1, a connecting rod 200 is generally indicated by reference numeral 200. The connecting rod 200 includes a main shank 205, a cap 220, nuts 211 and 212, and bolts 213 and 214. It should be noted that the preferred embodiment does not require the use of a separate bearing. The main shank 205 terminates at a piston end 206 defining a small opening 215 for connecting to a piston (not shown). The small opening 215 is connected to the piston by a straight bolt (not shown). A crankshaft end 207 opposite the piston end 206 defines a C-shaped opening 216. The ends of the C-shaped opening 216 define countersinks 217 and 218. The cap 220 is C-shaped with the ends defining through holes 221 and 222. The cap 220 is the same size as the opening 216 to allow it to mate with the crankshaft end 207 of the main shank 205. When the cap 220 is assembled with the main shank 205, the through holes 221 and 222 line up with the countersinks 217 and 218 so that the two parts can be fastened together with nuts 211 and 212 and bolts 213 and 214. An inner surface 230 of the opening 216 and an inner surface 231 of the cap 220 are elliptical.

Figure 2:
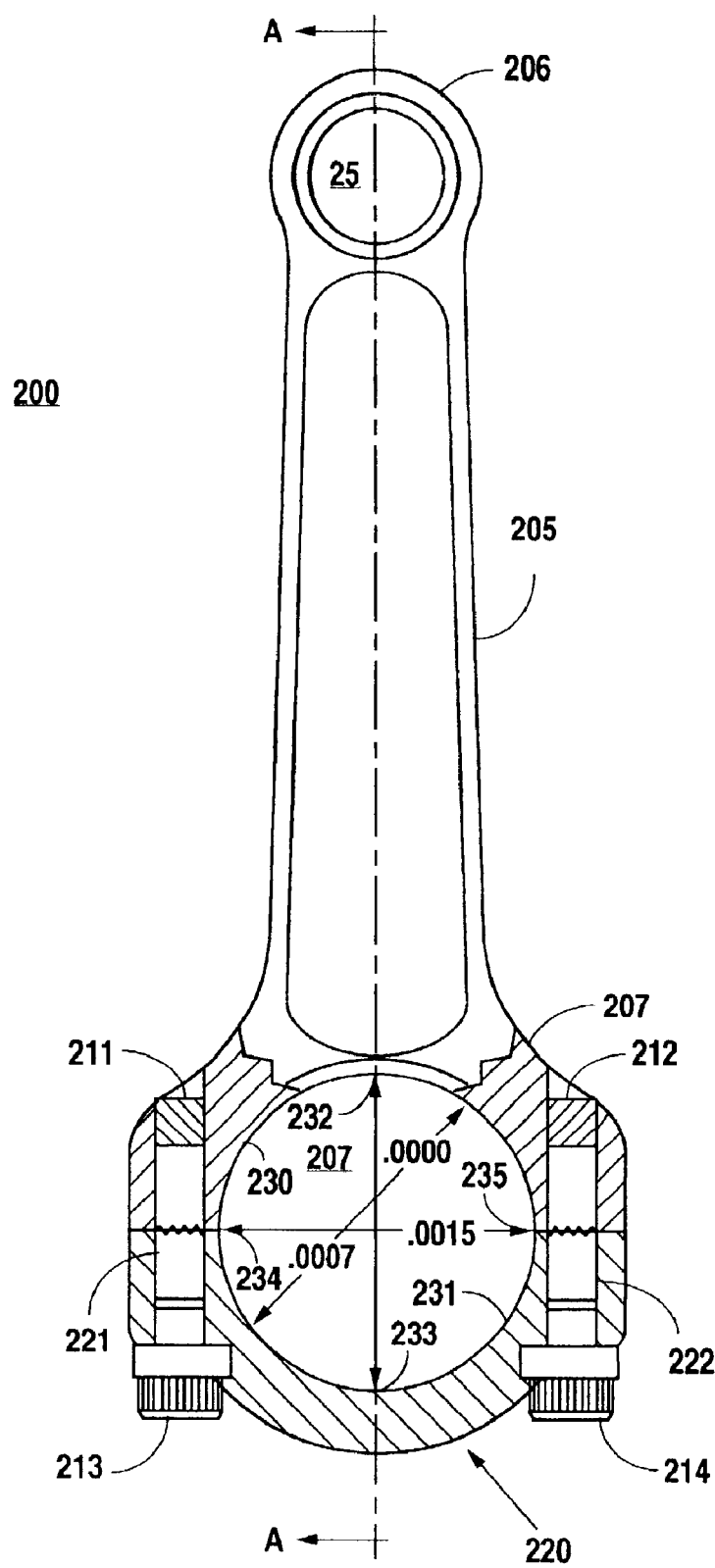
FIG. 2 is a front view of a partial sectional view of the preferred embodiment of the connecting rod with an elliptical opening.
Figure 3:
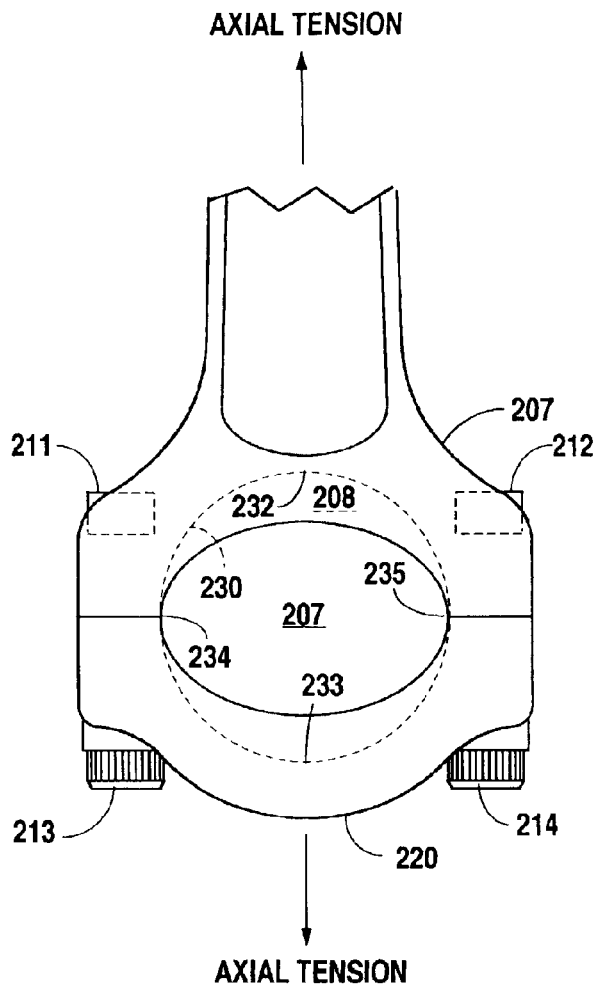
FIG. 3 is a front view of the preferred embodiment of the connecting rod with a elliptical opening before and during axial tension.

Referring to FIG. 2, to assemble the connecting rod 200 the cap 220 mates around a crankshaft (not shown) with the crankshaft end 207 of the main shank 205. It is important to make sure the through holes 221 and 222 respectively line up with the countersinks 217 and 218. Then, bolts 213 and 214 are inserted into the through holes 221 and 222 and fastened with the nuts 211 and 212. Now fully assembled, the inner surfaces 230 and 231 form an elliptical opening 207 around the crankshaft. When not in operation, there is a minimum clearance, such as 0", between the inner surfaces 230 and 231 and the crankshaft at top 232 and bottom 233 of the elliptical opening 207. Gradually, the clearance increases as you follow around the opening 207, reaching a maximum clearance at the sides, such as 0.0015", at the sides 234 and 235. During operation, axial tension stretches the connecting rod along its longitudinal axis deforming the elliptical opening 207 into a circular opening 208, as illustrated in FIG. 3. Consequently, the clearance at the top 232 and bottom 233 of the elliptical opening 207 increases while the clearance at the sides 234 and 235 decreases. It should be noted that the depiction of the openings 207 and 208 have been exaggerated to aid with illustration. As a result, a uniform clearance exists in between the circular opening 208 and the crankshaft. The uniform clearance provides for a uniform hydrodynamic oil film in between the inner surfaces 230 and 231 and the crankshaft. This oil film minimizes friction decreasing the risk of premature wear and mechanical failure. Those skilled in the art will recognize that the clearances between the inner surfaces 230 and 231 and the crankshaft may vary according to the multiple factors included in the design criteria of an engine. While the connecting rod 200 described here is a "cut" or "cracked" design, those skilled in the art will recognize that other designs, such as a unitary connecting rod, may be used.

Figure 4:
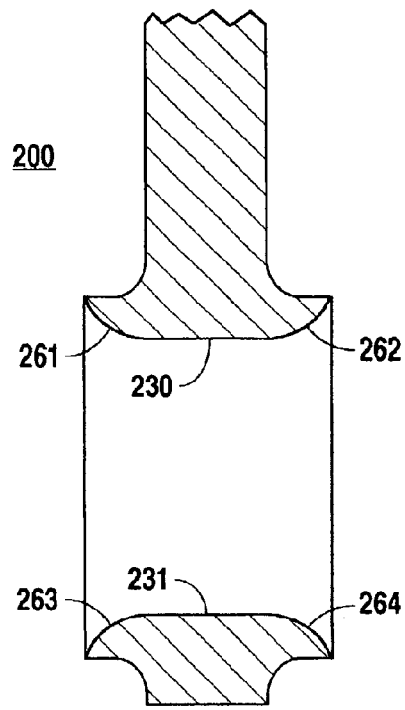
FIG. 4 is a side view of a partial sectional view along A—A of the preferred embodiment of the connecting rod with an elliptical opening.

FIG. 4 illustrates a partial sectional view along A—A in FIG. 2 of the connecting rod 200. During operation, the clearance between the inner surfaces 230 and 231 and the crankshaft allows the connecting rod to tilt slightly from side to side. Due to this phenomenon, any sharp edges on the inner surfaces 230 and 231 can cut into the crankshaft causing damage. To prevent this, in the present invention each edge of the inner surfaces 230 and 231 terminate in radii 261, 262, 263, and 264. In FIG. 4, the radii 261, 262, 263, and 264 have been exaggerated to aid in illustration. In addition to allowing tilting of the connecting rod, the radii 261, 262, 263, and 264 have the additional benefit of reducing the contact area between the inner surfaces 230 and 231 and the crankshaft. Less contact area results in less friction and heat lowering the risk of mechanical failure even further.

Figure 5A:
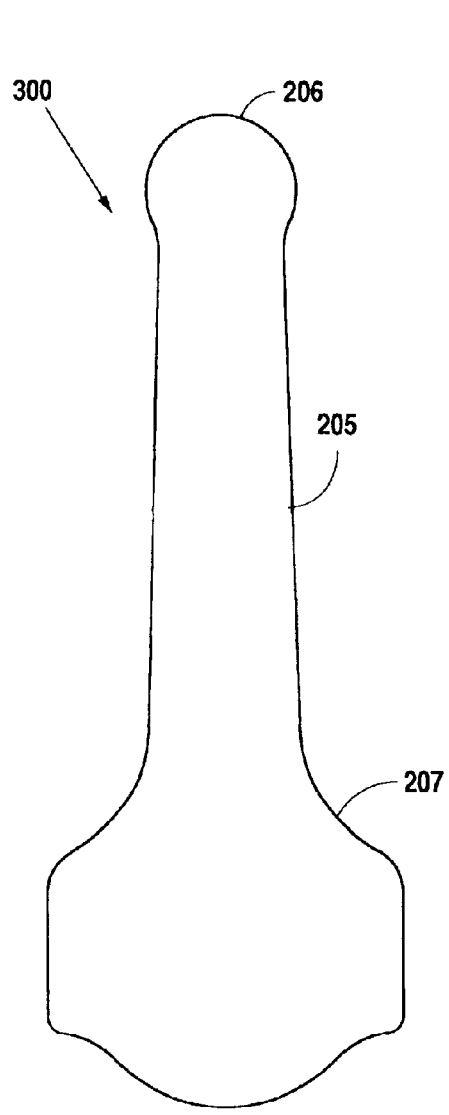
FIG. 5A is a front view of an initial form.
Figure 5B:
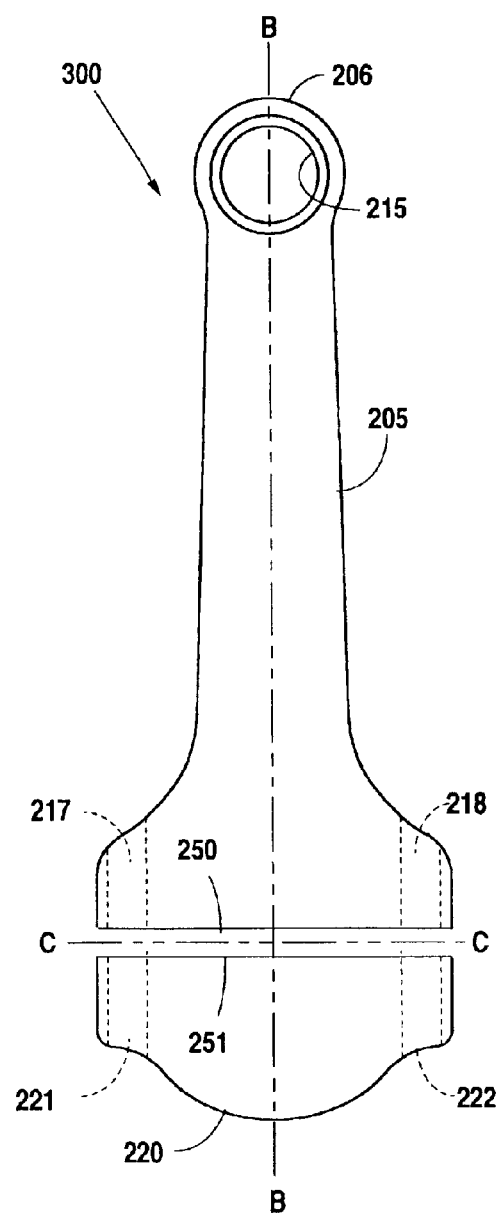
FIG. 5B is a front view of the initial form with a cap and small opening.

Referring to FIG. 5A, a new method of production is needed to produce a connecting rod 200 with an elliptical opening 207. First, an initial form 300 is created using an appropriate technique, such as forging, casting, or machining from bar stock or plate, from an appropriate material, such as steel, aluminum, other metals, and plastics or polymers. The initial form 300 includes a main shank 205, piston end 206 and a larger crankshaft end 207. Referring to FIG. 5B, a small opening 215 is machined in the piston end 206 perpendicular to the longitudinal axis A—A of the form 300 so that it may connect to a piston (not shown) with a fastener, such as a bolt. In addition, through holes 221 and 222 and countersinks 217 and 218 are machined in the crankshaft end 207 parallel to the longitudinal axis A—A of the form 300 so that fasteners, such as nuts and bolts, may be inserted.

Referring to FIG. 5B, the crankshaft end 207 is cut or cracked along a center axis B—B perpendicular to the longitudinal axis A—A of the form 300 to create a cap 220. Various tools and methods to cut or crack the form 300 are well known to those skilled in the art. Any of these tools or methods such as, separating with a slitting saw with a circular blade, splitting with a band saw, EDM (wire) cutting, or water jet cutting, may be used in the present invention. If necessary, the mating faces 250 and 251 of the crankshaft end 207 and cap 220 are machined to a smooth finish. This insures proper tolerances and alignment during assembly.

Figure 6:
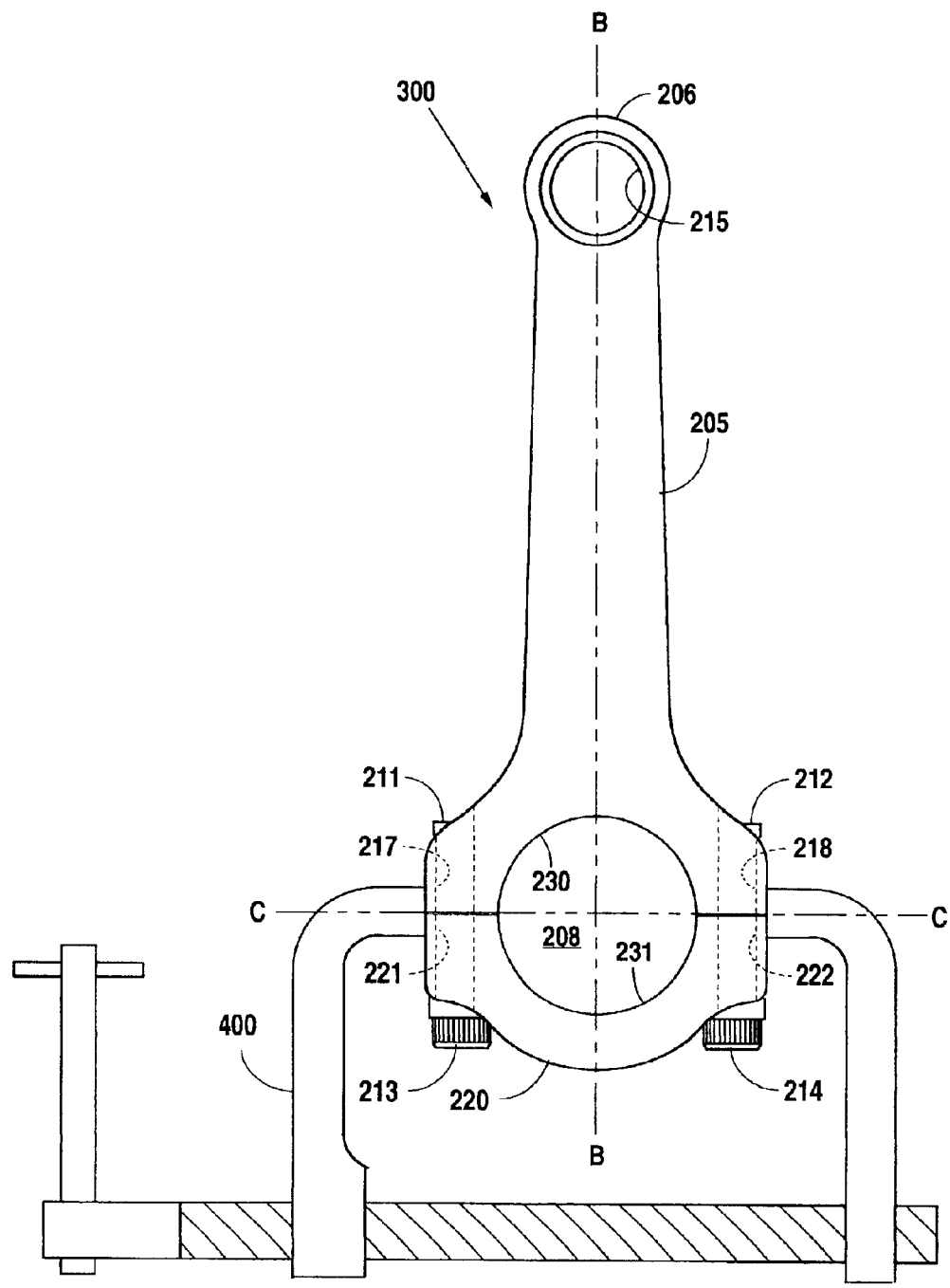
FIG. 6 is a front view of a C-clamp squeezing the preferred embodiment of the connecting rod during production.

Referring to FIG. 6, the cap 220 is mated to the crankshaft end 207 and fastened together using nuts 211 and 212 and bolts 213 and 214. This is done so that the main shank 205 and the cap 220 remain properly aligned during the following machining steps. Next, the crankshaft end 207 of the form 300 is squeezed or compressed along the cut or cracked axis B—B with a clamping means, such as a C-clamp 400. The C-clamp 400 deforms the form 300 so that the shape of the crankshaft end 207 resembles the shape it will be during operation under axially tension. While the example described herein discloses a C-clamp 400, those skilled in the art will recognize that other clamping means may be used, such as a vice, hydraulic clamps, pneumatic clamps, toggle clamps on a custom fixture, custom fixture with a screw type clamp, or a custom fixture with a wedge type clamp.

Under compression, a circular opening 208 with inner surfaces 230 and 231 is bored and honed out of the center of the crankshaft end 207 of the form 300 using a honing means, such as an automated honing machine. The circular opening 208 is sized using appropriate design tolerances so that the desired clearances are achieved during operation. While the example disclosed herein discloses an automated honing machine, those skilled in the art will recognize that other honing means may be used, such as a manual honing machine, boring bar, or burnishing.

Next, the clamp 400 releases the crankshaft end 207. No longer under compression, the temporarily deformed crankshaft end 207 rebounds to its original shape. As this happens, the circular opening 208 becomes an elliptical opening 207, as shown in FIG. 6. As a result, the elliptical opening 207 will deform into a circular opening 208 under axial tension during operation, as illustrated in FIG. 3, eliminating the need for a bearing.

Finally, each edge of inner surfaces 230 and 231 are formed into radii 261, 262, 263, and 264 by a means, such as hand polishing. Although the preferred embodiment discloses hand polishing, those skilled in the art will recognize that other means may be used, such as an automatic polishing machine.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method for producing a connecting rod comprising the steps of:

creating an initial form with a main shank, a piston end, and a crankshaft end;

forming a small opening in the piston end perpendicular to a longitudinal axis of the initial form;

forming through holes in the crankshaft end parallel to the longitudinal axis of the initial form;

forming countersinks in the crankshaft end parallel to the longitudinal axis of the initial form;

cutting the crankshaft end along a center axis perpendicular to the longitudinal axis of the initial form and form a cap and a first and second mating face;

mating the cap with the crankshaft end; fastening the cap to the crankshaft end with nuts and bolts inserted into the through holes and countersinks;

compressing the crankshaft end with a force sufficient to deform the crankshaft end;

honing a circular opening in the compressed crankshaft end; and releasing the compression on the crankshaft end, allowing the crankshaft end to return to its original shape and form to an elliptical opening in the crankshaft end of the connecting rod.

2. The method of claim 1, comprising the additional step of machining the first and second face to a smooth finish.

3. The method of claim 1, wherein the step of creating an initial form comprises forging.

4. The method of claim 1, wherein the step of creating an initial form comprises casting.

5. The method of claim 1, wherein the step of creating an initial form comprises machining from a bar stock.

6. The method of claim 1, wherein compressing the crankshaft end is carried out by compressing the crankshaft end with a C-clamp.

7. The method of claim 1, wherein compressing the crankshaft end is carried out by compressing the crankshaft end with a hydraulic clamp.

8. The method of claim 1, comprising the additional step of forming radii at each edge of the elliptical opening.

9. The method of claim 8, wherein forming radii at each edge of the elliptical opening is carried out by hand polishing.

* * * * *